United States Patent
Fujishima et al.

(10) Patent No.: US 6,710,961 B1
(45) Date of Patent: Mar. 23, 2004

(54) FLOPPY DISC DRIVE APPARATUS

(75) Inventors: Makoto Fujishima, Nagano (JP); Hisashi Fukuzawa, Nagano (JP)

(73) Assignee: Sankyo Seiki Mfg. Co., Ltd., Nagano (JP)

(*) Notice: Subject to any disclaimer, the term of this patent is extended or adjusted under 35 U.S.C. 154(b) by 209 days.

(21) Appl. No.: 09/666,122

(22) Filed: Sep. 20, 2000

(30) Foreign Application Priority Data

Sep. 22, 1999 (JP) .......................................... 11-268503

(51) Int. Cl.[7] .............................................. G11B 15/18
(52) U.S. Cl. ..................... 360/69; 360/73.03; 360/99.01
(58) Field of Search .......................... 360/99.01, 99.08, 360/69, 73.03; 710/1, 305

(56) References Cited

U.S. PATENT DOCUMENTS

| | | | | |
|---|---|---|---|---|
| 4,604,663 A | * | 8/1986 | Moribe et al. | 360/73.03 |
| 4,622,602 A | * | 11/1986 | Kutaragi | 710/1 |
| 4,814,926 A | * | 3/1989 | Gulbrandsen | 360/133 |
| 4,857,866 A | * | 8/1989 | Tateishi | 331/1 A |
| 5,301,300 A | * | 4/1994 | Ritz | 710/305 |
| 5,434,722 A | * | 7/1995 | Bizjak et al. | 360/69 |
| 5,537,281 A | * | 7/1996 | Ma et al. | 360/133 |
| 5,577,234 A | * | 11/1996 | Hanabusa et al. | 703/24 |
| 5,680,587 A | * | 10/1997 | Bodo et al. | 703/23 |
| 5,783,880 A | * | 7/1998 | Teshima et al. | 310/67 R |
| 5,956,205 A | * | 9/1999 | Konno et al. | 360/99.02 |
| 6,282,045 B1 | * | 8/2001 | Glover | 360/73.03 |
| 6,289,397 B1 | * | 9/2001 | Tsuyuguchi et al. | 710/1 |
| 6,351,093 B1 | * | 2/2002 | Kato et al. | 318/685 |
| 2001/0003630 A1 | * | 6/2001 | Aonuma et al. | 428/694 BA |

* cited by examiner

Primary Examiner—David Hudspeth
Assistant Examiner—Jason Olson
(74) Attorney, Agent, or Firm—Hogan & Hartson, LLP

(57) ABSTRACT

A floppy disc drive apparatus includes a spindle motor, a magnetic head, a drive mechanism, a mechanism controller, a floppy disc controller, and a universal serial bus interface. The spindle motor rotatably drives a floppy disc at a rotational speed of 600 rpm or more. The magnetic head reads and records data on the floppy disc. The drive mechanism has an actuator that scans the magnetic head in a radial direction of the floppy disc. The mechanism controller controls the drive mechanism to thereby reproduce and record specified data on the floppy disc. The floppy disc controller transfers and receives data to and from the mechanism controller at a transfer rate of 1 Mbit/s or greater. The universal serial bus interface allows the floppy disc controller to transfer and receive data to and from an external apparatus at a transfer rate of 1 Mbit/s or greater.

18 Claims, 5 Drawing Sheets

FLOPPY DISC DRIVE APPARATUS

BACKGROUND OF THE INVENTION

1. Field of the Invention

The present invention relates to a floppy disc drive apparatus that drives a floppy disc.

2. Description of Related Art

A floppy disc drive apparatus for driving a 3.5 inch floppy disc requires a spindle motor that rotatably drives the floppy disc, a magnetic head that reproduces and records data on the floppy disc, a drive mechanism having an actuator that scans the magnetic head in a radial direction of the floppy disc, a mechanism controller that controls the drive mechanism to thereby reproduce and record specified data on the floppy disc, and a floppy disc controller that transfers and receives data to and from the mechanism controller.

Typically, as shown in FIG. 5, a floppy disc controller 30 is installed inside a main control apparatus such as a computer 5 that controls an independent floppy disc drive apparatus 1A. A drive mechanism 10 that drives a floppy disc 2 and a floppy disc mechanism controller 20 (hereafter referred to as "mechanism controller) that controls the drive mechanism 10 are mounted on the floppy disc drive apparatus 1A. Therefore, data that is to be recorded on or read from the floppy disc 2 by the magnetic head is transferred between the mechanism controller 20 that is installed in the floppy disc drive apparatus 1A and the floppy disc controller 30 that is installed in the computer 5 through a general purpose interface 40A at a transfer rate of 500 kbit/s. The computer 5 and the floppy disc drive apparatus 1A are also connected by the general purpose interface 40A with 26 pins or 34 pins to transfer various signals for controlling the mechanism controller 20, in addition to data that is to be recorded on or reproduced from the floppy disc 2.

In recent years, universal serial buses (USBs) are widely used in computer apparatuses. Accordingly, floppy disc drive apparatuses that are connected to controller apparatuses through USBs are more widely used. A typical USB type floppy disc drive apparatus includes a drive mechanism, a mechanism controller and a floppy disc controller that are mounted inside the floppy disc drive apparatus. The USB type floppy disc drive apparatus can transfer and receive data to and from an external apparatus, a computer, through a USB interface at a relatively high data transfer rate.

Under the circumstances, in many occasions, a conventional general-use type floppy disc drive apparatus 1A that is connectable to bus types other than USBs is modified in order to make the conventional general-use type floppy disc drive apparatus 1A connectable to USBs. For example, a floppy disc controller 30 and a USB interface 40 are added in the floppy disc drive apparatus 1A to form a USB connectable floppy disc drive apparatus 1B, as shown in FIG. 6. The floppy disc drive apparatus 1B is constructed in a manner that floppy discs are interchangeable between the floppy disc drive apparatus 1B and the conventional general-use type floppy disc drive apparatus 1A. In other words, while the USB connectable floppy disc drive apparatus 1B shown in FIG. 6 is connectable to a USB, data is transferred between the mechanism controller 20 and the floppy disc controller 30 at a data transfer rate of 500 kbit/s in order to maintain the interchangeability. As a result, the conventional USB connectable floppy disc drive apparatus 1B shown in FIG. 6 transfers and receives data to and from an external apparatus, such as, a computer apparatus through a USB interface 40 at a data transfer rate of 500 kbit/s.

SUMMARY OF THE INVENTION

It is an object of the present invention to provide a floppy disc drive apparatus that is connectable to a USB and maintains the interchangeability of floppy discs with a conventional floppy disc drive apparatus, and that can improve the data transfer rate to and from an external apparatus.

To achieve the object described above, a floppy disc drive apparatus in accordance with one embodiment of the present invention includes a spindle motor that rotatably drives a floppy disc at a rotational speed of about 600 rpm or higher, more preferably, at a rotational speed of 600 rpm or higher. The floppy disc drive apparatus also includes a magnetic head, a drive mechanism and a mechanism controller. The magnetic head reads and records data on the floppy disc. The drive mechanism having an actuator scans the magnetic head in a radial direction of the floppy disc. The mechanism controller controls the drive mechanism to thereby reproduce and record specified data on the floppy disc. In one feature of the embodiment, the floppy disc drive apparatus includes a floppy disc controller that transfers and receives data to and from the mechanism controller at a transfer rate of 1 Mbit/s or greater, and a universal serial bus interface that allows the floppy disc controller to transfer and receive data to and from an external apparatus at a transfer rate of about 1 Mbit/s or greater, and more preferably at a transfer rate of 1 Mbit/s or greater.

In the floppy disc drive apparatus in accordance with the embodiment of the present invention, the floppy disc controller is mounted on the floppy disc drive apparatus, not on an external control apparatus such as an independent computer. Also, in a floppy disc drive apparatus connectable to a USB in accordance with one embodiment of the present invention, a mechanism controller rotates a spindle motor (i.e., a floppy disc) at a rotational speed of 600 rpm or higher, and data is transferred between the mechanism controller and the floppy disc controller at a data transfer rate of 1 Mbit/s.

Accordingly, in the USB connectable floppy disc drive apparatus in accordance with the embodiment of the present invention, a data transfer rate within the floppy disc drive apparatus is set at 1 Mbit/s or greater. As a result, the data transfer rate is increased two times or greater compared to the general-use type conventional floppy disc drive apparatus or the conventional USB connectable floppy disc drive apparatus, and the data transfer rate between the floppy disc drive apparatus and the computer is increased two times or greater. Accordingly, the floppy disc drive apparatus can record and reproduce data on a floppy disc at a rate twice or more higher than that of the conventional floppy disc drive apparatus. Moreover, while the data recording speed and the data reproducing speed are substantially increased compared to the general-use type conventional floppy disc drive apparatus or the conventional USB connectable floppy disc drive apparatus, the rotational speed of the motor is also proportionally increased. As a result, the floppy disc drive apparatus of the present invention can record and read data on floppy discs with the same line density as the conventional floppy disc drive apparatus does. As a result, the floppy disc drive apparatus in accordance with the embodiment of the present invention maintains the interchangeability of floppy discs with the conventional general-use type floppy disc drive apparatus or the conventional USB connectable floppy disc drive apparatus.

In accordance with one feature of the embodiment of the present invention, the spindle motor may preferably be a peripheral-surfaces-opposing type motor that includes a cylindrical drive magnet and a stator core in which an internal peripheral surface of the drive magnet is disposed opposite in a radial direction to an external peripheral surface of the stator core. By this structure, the motor can achieve a higher and yet stable rotation compared to a spindle motor in which a drive magnet and a stator core are disposed opposite to each other in a thrust direction.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIG. 4 is a graph showing motor characteristics of the spindle motor shown in FIG. 3.

DESCRIPTOIN OF PREFERRED EMBODIMENT

Embodiments of the present invention will be described below with reference to the accompanying drawings.

Figure 1:
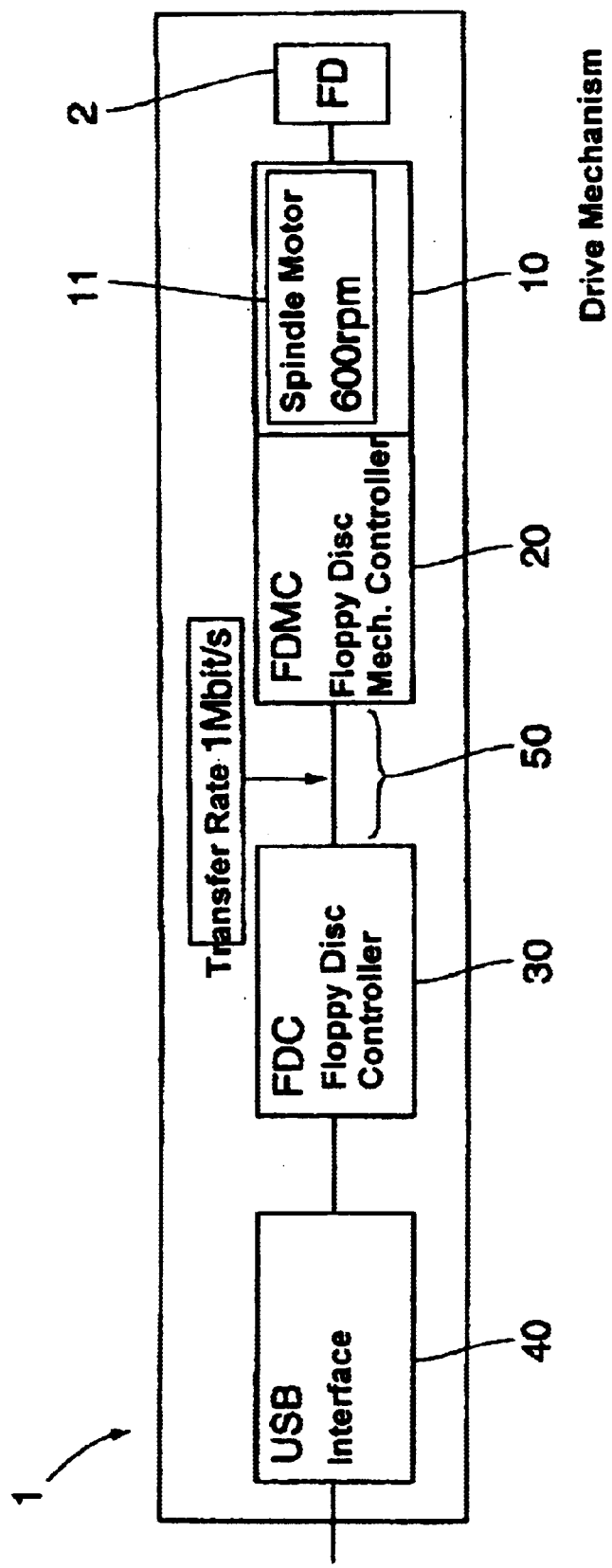
FIG. 1 shows a block diagram of an overall structure of a USB connectable floppy disc drive apparatus that is connectable to a USB in accordance with the present invention.
Figure 2:
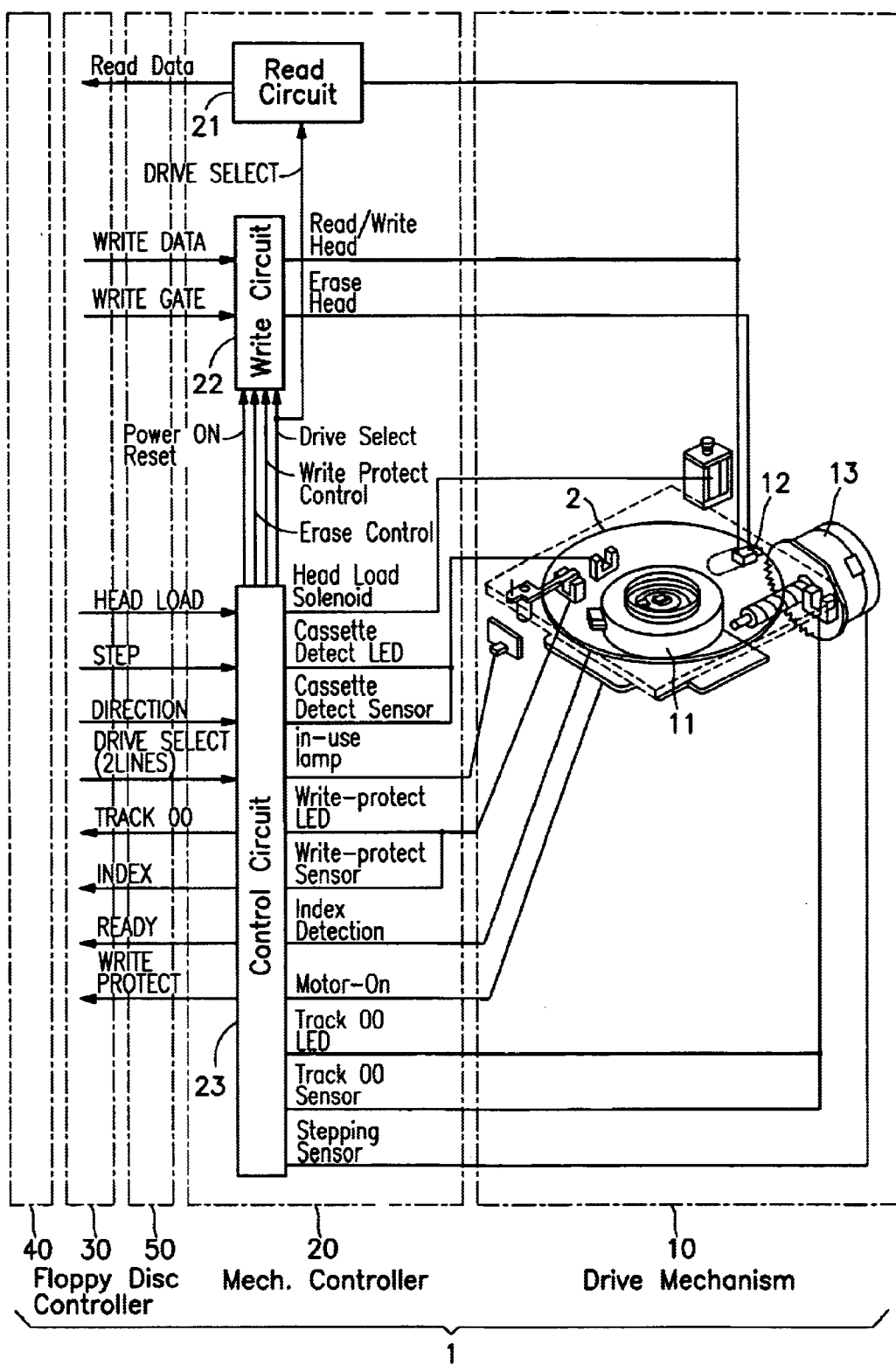
FIG. 2 illustrates the floppy disc drive apparatus shown in FIG. 1 in greater detail.
Figure 3:
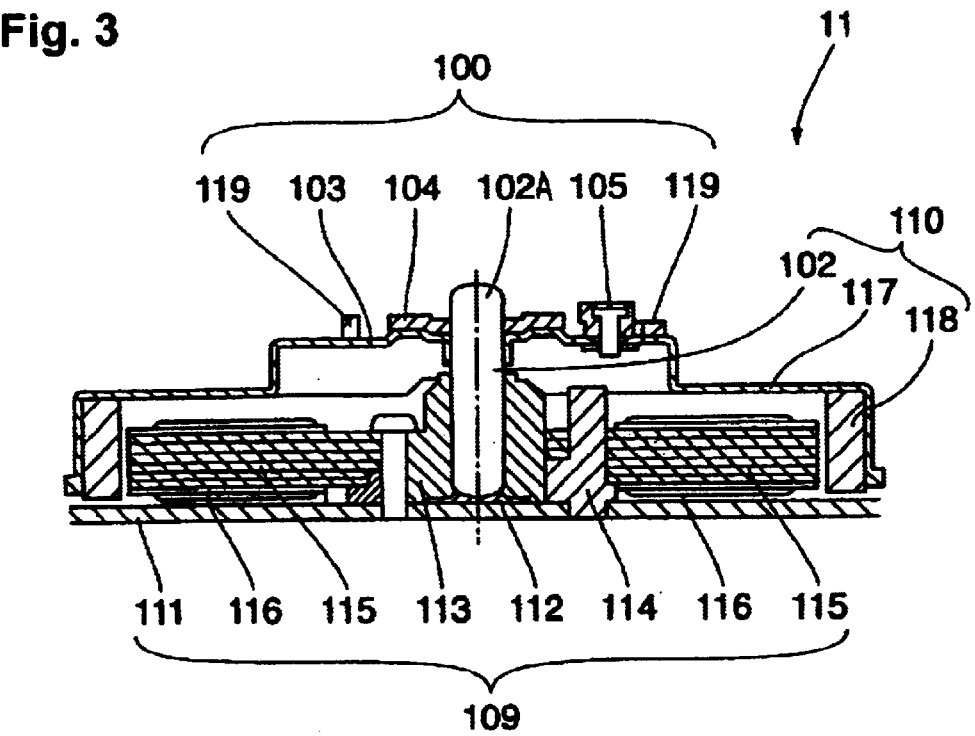
FIG. 3 is a cross-sectional view of a spindle motor used in the floppy disc drive apparatus.
Figure 4:
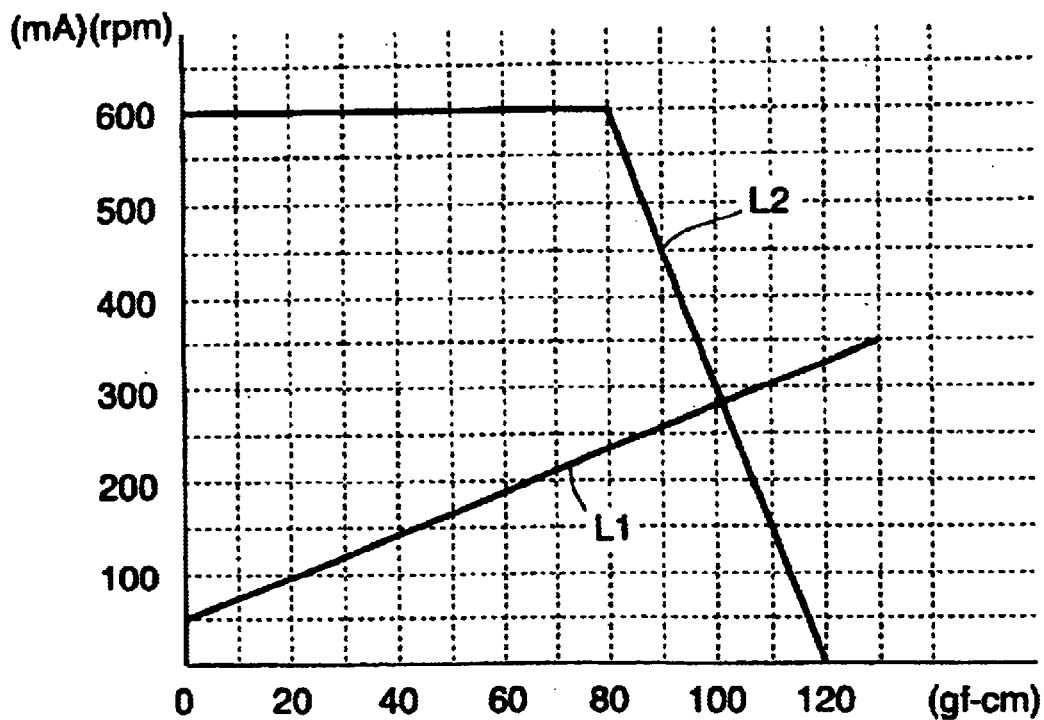
FIG. 4 is a graph showing characteristics of the spindle motor.

FIG. 1 shows a block diagram of an overall structure of a USB connectable floppy disc drive apparatus that is connectable to USBs in accordance with one embodiment of the present invention. FIG. 2 illustrates the floppy disc drive apparatus shown in FIG. 1 in greater detail. FIG. 3 is a cross-sectional view of a spindle motor used in the floppy disc drive apparatus, and FIG. 4 is a graph showing characteristics of the spindle motor. In the description of the USB connectable floppy disc drive apparatus in accordance with the embodiment of the present invention, elements having similar functions as those of the conventional floppy disc drive apparatus are referred to by the same reference numbers that are used to describe the conventional floppy disc drive apparatus.

As shown in FIGS. 1 and 2, a floppy disc drive apparatus 1 of the present embodiment is a USB connectable floppy disc drive apparatus that uses a 3.5 inch floppy disc 2 as a subsidiary storage media of a computer. In one embodiment, the USB connectable floppy disc drive apparatus 1 includes a spindle motor 11 that rotatably drives the floppy disc 2 at a rotational speed of 600 rpm or higher, a magnetic head 12 that reads and records data on the floppy disc 2, a drive mechanism 10 having devices such as a step motor 13 (an actuator) that scans the magnetic head 12 in a radial direction of the floppy disc 2, a mechanism controller 20 that controls the drive mechanism 10 to reproduce and record specified data on the floppy disc 2, a floppy disc controller 30 that transfers and receives data to and from the mechanism controller 20 at a transfer rate of 1 Mbit/s or greater, and a universal serial bus interface 40 that allows the floppy disc controller 30 to transfer and receive data to and from an external apparatus at a transfer rate of 18 Mbit/s or greater.

Figure 5:
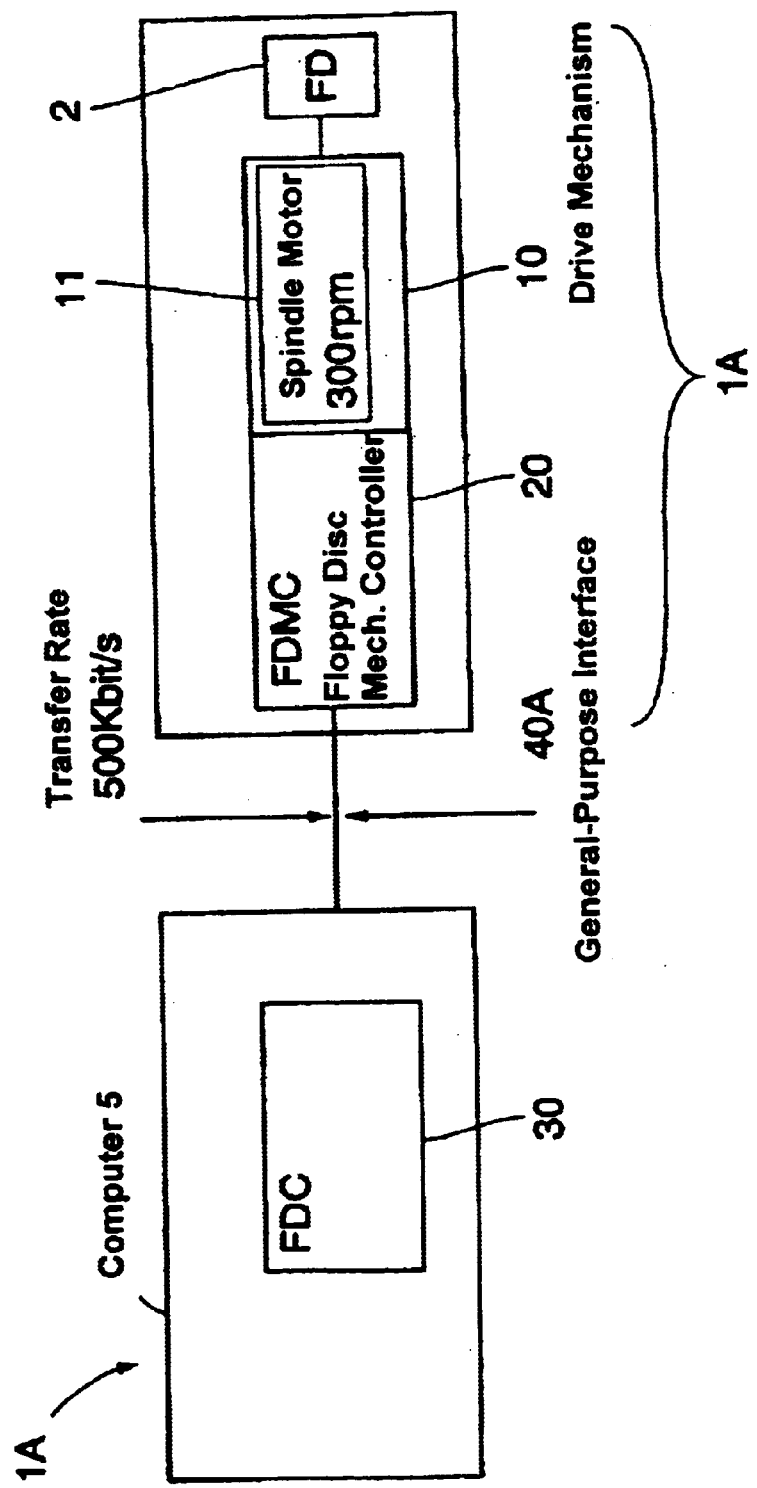
FIG. 5 shows a block diagram of an overall structure of a conventional general-use type floppy disc drive apparatus.
Figure 6:
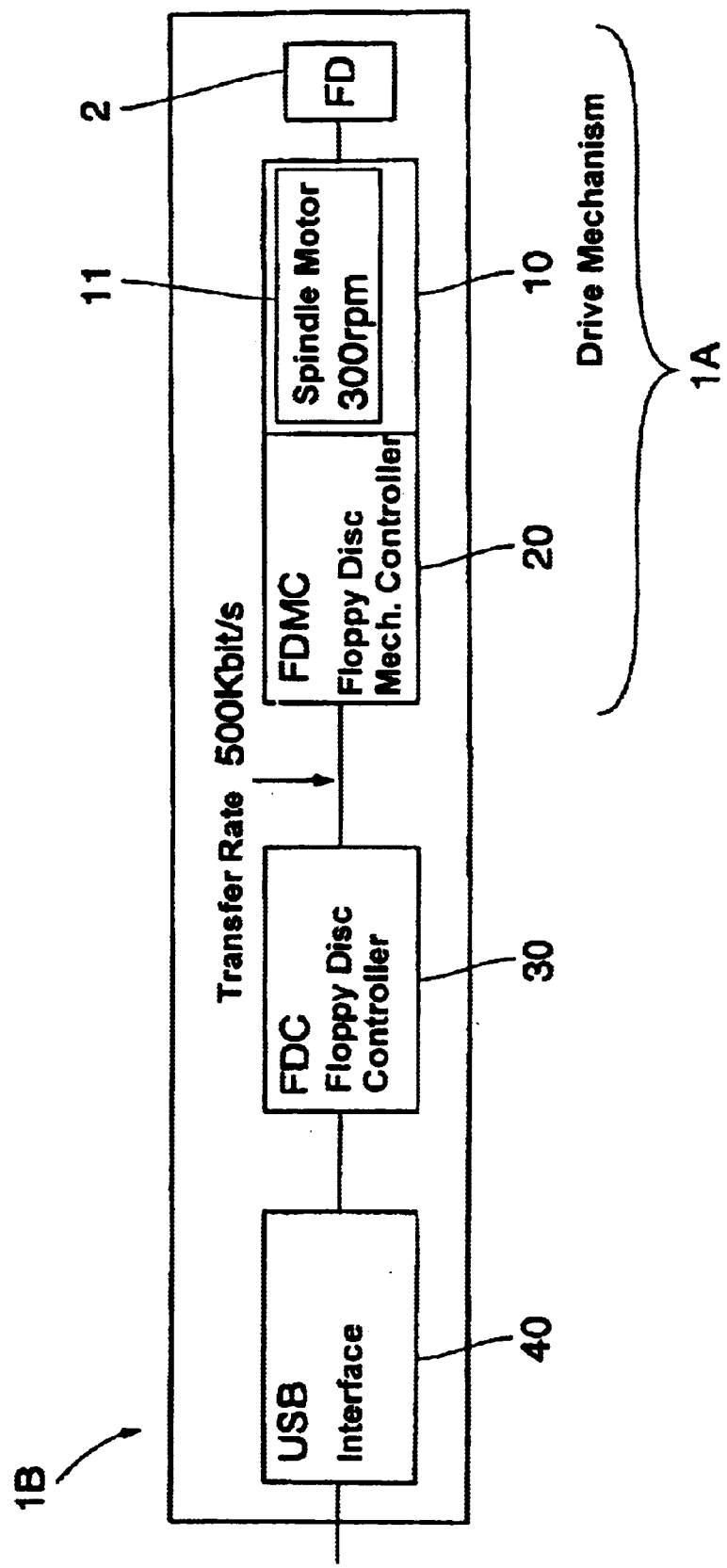
FIG. 6 shows a block diagram of an overall structure of a conventional USB connectable floppy disc drive apparatus.

It is noted that, in the conventional general-use type floppy disc drive apparatus 1A described with reference to FIG. 5, the floppy disc controller 30 is installed in the computer 5 of the main apparatus that controls the floppy disc drive apparatus 1A which is independent and separate from the computer 5. In contrast, in accordance with the embodiment of the present invention, the floppy disc controller 30 is mounted on the USB connectable floppy disc drive apparatus 1. For example, the floppy disc controller 30 is installed in a housing of the USB connectable floppy disc drive apparatus 1. In the conventional USB connectable floppy disc drive apparatus 1B described above with reference to FIG. 6, the spindle motor 11 is rotated at 300 rpm, and the data transfer rate between the mechanism controller 20 and the floppy disc controller 30 is 500 kbit/s. However, in the USB connectable floppy disc drive apparatus 1 in accordance with the embodiment of the present invention, the mechanism controller 20 rotates the spindle motor 11 at a rotational speed of 600 rpm or higher, and data is transferred between the mechanism controller 20 and the floppy disc controller 30 at a data transfer rate of 1 Mbit/s or greater.

In accordance with the embodiment of the present invention, the mechanism controller 20 may preferably be set such that the spindle motor 11 is rotated at a rotational speed of (300×n) rpm, and data is transferred to and from the floppy disc controller 30 at a data transfer rate of (500×n) kbit/s, wherein n is an integer that is two or greater. By this setting, data is recorded on the floppy disc 2 with the same line density as that attained by the conventional floppy disc drive apparatus 1B. Therefore, the floppy disc 2 is interchangeable between the conventional floppy disc drive apparatuses 1A and 1B and the USB connectable floppy disc drive apparatus 1 of the present invention.

In accordance with the embodiment of the present invention, the mechanism controller 20 includes a read circuit 21, a write circuit 22 and a control circuit 23. The circuits control the spindle motor 11 to rotate at a rotational speed of 600 rpm, and achieve the data transfer to and from the floppy disc controller 30 at the data transfer rate of 1 Mbit/s.

In the USB connectable floppy disc drive apparatus 1 of the embodiment the present invention, the mechanism controller 20 and the floppy disc controller 30 exchange control signals such as read data and write data. Therefore, the mechanism controller 20 and the floppy disc controller 30 are connected to each other by a flat cable 50 that is formed from many signal lines for transferring various signals. Accordingly, only two types of date, i.e., recording data and reproduced data are exchanged between the computer and the floppy disc drive apparatus 1 through the universal serial bus interface 40.

Also, in the USB connectable floppy disc drive apparatus 1 of the embodiment of the present invention, a peripheral-surfaces opposing type motor is used as the spindle motor 11 so as to enable a higher and stable rotation of the floppy disc 2.

In one embodiment, the spindle motor 11 used in the floppy disc drive apparatus 1 includes a stator assembly 109, a rotor assembly 110, and a disc chucking apparatus 100 that is formed over the rotor assembly 110. The stator assembly 109 includes a stator substrate 111, a thrust bearing 112 and a radial bearing 113 mounted on the stator substrate 111, a core holder 114 attached to an external surface of the radial bearing 113, stator cores 115 retained by the core holder 114, and core coils 116 wound around the stator cores 115. The rotor assembly 110 includes a rotary shaft 102 that is rotatably supported by the thrust bearing 112 and the radial bearing 113, a cup-like rotor case 117 concentrically affixed to the rotary shaft 102, and a cylindrical drive magnet 118 that is attached to an internal peripheral surface of the rotor case 117. Accordingly, the internal peripheral surface of the drive magnet 118 is disposed opposite in a radial direction to an external peripheral surface of the stator cores 115.

The disc chucking apparatus 100 is formed from a tip section 102A of the rotary shaft, a turntable 103 concentrically attached to the rotary shaft 102, an arcuate swing arm 105, and a chucking magnet 119 that is attached to the turntable 103. A protruded section 104 that is concentric with the rotary shaft 102 is formed at the central area of the turntable 103. A surface of the protruded section 104 is covered by a resin. The protruded section 104 is slightly higher than the surface of the chucking magnet 119.

Typically, the floppy disc 2 has a metal hub defining a central aperture and a drive aperture formed at a location spaced a distance from the central aperture (not shown). The tip section 102A of the rotary shaft 102 is inserted in the central aperture of the hub, while a drive pin of the swing arm 105, which is located at the same radial distance as the drive aperture, is inserted in the drive aperture. In this manner, the disc chucking apparatus 100 retains the floppy disc 2 through the metal hub that is a component of the floppy disc 2. Accordingly, the spindle motor 11 rotates the floppy disc 2 through the hub of the floppy disc 2.

The spindle motor 11 having the structure descried above can stably rotate at high speed even under a large torque, compared with a motor in which a drive magnet is disposed opposite in a thrust direction to stator cores. For example, the spindle motor 11 used in the floppy disc drive apparatus of the present embodiment has characteristics in which motor currents and rotational speeds for different torque, indicated respectively by solid lines L1 and L2, change according to the graph shown in FIG. 4. It is observed that the rotational speed of 600 rpm that is set in the floppy disc drive apparatus 1 of the present embodiment is stably maintained until the torque reaches 80 gf-cm.

The USB connectable floppy disc drive apparatus 1 thus composed sets the data transfer rate within the floppy disc drive apparatus 1 at 1 Mbit/sec, which is twice as fast as the data transfer rate of the conventional floppy disc drive apparatus 1A or the conventional USB connectable floppy disc drive apparatus 1B. Accordingly, the data transfer rate between the USB connectable floppy disc drive apparatus 1 and the computer is also doubled. Therefore, the data recording speed or reproducing speed for recording or reproducing data on the floppy disc 2 in the floppy disc drive apparatus 1 is also doubled.

Also, while the data recording and reproducing speeds are doubled compared with the conventional general-use type floppy disc drive apparatus 1A or the conventional USB connectable floppy disc drive apparatus 1B, the rotational speed of the spindle motor 11 in the USB connectable floppy disc drive apparatus 1 is also doubled. Therefore, the USB connectable floppy disc drive apparatus 1 of the present embodiment can record and read data on floppy discs with the same line density as the conventional general-use type floppy disc drive apparatus 1A or the conventional USB connectable floppy disc drive apparatus 1B does. As a result, the USB connectable floppy disc drive apparatus 1 of the present embodiment can reproduce data on a floppy disc that is recorded by the conventional general-use type floppy disc drive apparatus 1A or the conventional USB connectable floppy disc drive apparatus 1B. Conversely, the general-use type conventional floppy disc drive apparatus 1A or the conventional USB connectable floppy disc drive apparatus 1B can reproduce date on a floppy disc that is recorded by the USB connectable floppy disc drive apparatus 1 of the present embodiment.

Also, in the USB connectable floppy disc drive apparatus 1 in accordance with the embodiment of the present invention, the mechanism controller 20 and the floppy disc controller 30 are connected via the cable 50. Accordingly, the rotational speed of the motor and the data transfer rate may be changed in the conventional general-use type floppy disc drive apparatus 1A that is equipped with the drive mechanism 10 and the mechanism controller 20, and such a floppy disc drive apparatus 1A is connected to the floppy disc controller 30 via the cable 50 to thereby compose the USB connectable floppy disc drive apparatus 1 of the present invention.

Furthermore, because a peripheral-surfaces opposing type motor is used as the spindle motor 11, a high speed and yet stable rotation can be realized when the rotational speed of the motor is increased.

It is noted that, in the embodiment described above, the spindle motor 11 is rotated at a rotation speed of 600 rpm, and data is transferred between the mechanism controller 20 and the floppy disc controller 30 at a data transfer rate of 1 Mbit/s. However, the rotational speed of the spindle motor 11 and the data transfer rate can be further increased if the interchangeability of floppy discs can be maintained between the USB connectable floppy disc drive apparatus 1 of the present invention and the conventional floppy disc drive apparatuses 1A and 1B.

As described above, a USB connectable floppy disc drive apparatus in accordance with the embodiment of the present invention sets the data transfer rate within the floppy disc drive apparatus at 1 Mbit/sec or greater, which is twice or more as fast as the data transfer rate of a general-use type conventional floppy disc drive apparatus or a conventional USB connectable floppy disc drive apparatus. Accordingly, the data transfer rate between the floppy disc drive apparatus and the computer is also increased two or more times greater. Therefore, the data recording speed or data reproducing speed for recording or reproducing data on a floppy disc in the floppy disc drive apparatus is also increased two or more times greater. Also, while the data recording and reproducing speeds are doubled compared with the conventional general-use type floppy disc drive apparatus or the conventional USB connectable floppy disc drive apparatus, the rotational speed of the motor is proportionally increased. Therefore, the floppy disc drive apparatus of the present embodiment can record and read data on floppy discs with the same line density as the conventional general-use type floppy disc drive apparatus or the conventional USB connectable floppy disc drive apparatus does. As a result, floppy discs can be interchanged between the USB connectable floppy disc drive apparatus of the present invention and the conventional floppy disc drive apparatuses.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A floppy disc drive apparatus comprising:
   a spindle motor that rotatably drives a floppy disc at a rotational speed of 600 rpm or more;
   a magnetic head that reads and records data on the floppy disc;
   a drive mechanism having an actuator that scans the magnetic head in a radial direction of the floppy disc;
   a mechanism controller coupled to the drive mechanism to control the drive mechanism to thereby rotate the spindle motor and to read and record specified data on the floppy disc;
   a floppy disc controller coupled to the mechanism controller to transfer and receive data to and from the mechanism controller at a transfer rate of 1 Mbit/s or greater; and
   a universal serial bus interface that allows the floppy disc controller to transfer and receive data at a data transfer rate of 1 Mbit/s or greater.

2. A floppy disc drive apparatus according to claim 1, wherein the mechanism controller and the floppy disc controller are controlled by a cable.

3. A floppy disc drive apparatus according to claim 2, further comprising a base member, wherein the floppy disc controller, the drive mechanism and the mechanism controller are mounted on the base member.

4. A floppy disc drive apparatus according to claim 1, wherein the spindle motor is rotated at a rotational speed of (300×n) rpm, where n is an integer that is two or greater, and transfers and receives data to and from the floppy disc controller at a transfer rate of (500×n) kbit/s.

5. A floppy disc drive apparatus according to claim 4, wherein the mechanism controller controls the spindle motor to rotate at a rotational speed of 600 rpm and transfers and receives data to and from the floppy disc controller at a transfer rate of 1 Mbit/s, and transfers and receives data through the universal serial bus interface at a transfer rate of 1 Mbit/s.

6. A floppy disc drive apparatus according to claim 5, further comprising a base ember, wherein the floppy disc controller, the drive mechanism and the mechanism controller are mounted on the base member.

7. A floppy disc drive apparatus according to claim 4, wherein the spindle motor is a peripheral-surfaces-opposing type motor that includes a cylindrical drive magnet and stator cores in which an internal peripheral surface of the drive magnet is disposed opposite in a radial direction to an external peripheral surface of the stator cores.

8. A floppy disc drive apparatus according to claim 1, wherein the mechanism controller controls the spindle motor to rotate at a rotational speed of (360×n) rpm and transfers and receives data to and from the floppy disc controller at a transfer rate of (500×n) kbit/s, and transfers and receives data through the universal serial bus interface at a transfer rate of (500×n) kbit/s, where n is an integer that is two or greater.

9. A disc drive apparatus comprising:
   a spindle motor that rotates at a rotational speed of 600 rpm or more;
   a magnetic head that reads and records data on a disc;
   a drive mechanism having an actuator that scans the magnetic head in a radial direction of the disc;
   a mechanism controller coupled to the drive mechanism to control the drive mechanism to thereby controllably rotate the spindle motor to read and record specified data on the disc;
   a disc controller coupled to the mechanism controller to transfer and receive data to and from the mechanism controller at a transfer rate of 1 Mbit/s or greater; and
   a universal serial bus interface that allows the disc controller to transfer and receive data at a data transfer rate of 1 Mbit/s or greater.

10. A disc drive apparatus according to claim 9, wherein the mechanism controller and the disc controller are connected by a cable.

11. A disc drive apparatus according to claim 10, further comprising a base member, wherein the disc controller, the drive mechanism and the mechanism controller are mounted on the base member.

12. A disc drive apparatus according to claim 9, wherein the spindle motor is rotated at rotational speed of (300×n) rpm, where n is an integer that is two or greater, and transfers and receives data to and from the disc controller at a transfer rate of (500×n) kbit/s.

13. A floppy disc drive apparatus according to claim 9, wherein the spindle motor includes a cylindrical drive magnet and stator cores in which an internal peripheral surface of the drive magnet is disposed opposite in a radial direction to an external peripheral surface of the stator cores.

14. A method of operating a floppy disc drive apparatus, the method comprising the steps of:
   rotatably driving a spindle motor at a rotational speed of (300×n) rpm, where n is an integer that is two or greater;
   operating a drive mechanism to move a magnetic head in a radial direction of a floppy disc to read and record data on a floppy disc by the magnetic head;
   controlling the drive mechanism by a mechanism controller to thereby controllably rotate the spindle motor to read and record specified data on the floppy disc;
   transferring data between a floppy disc controller and the mechanism controller at a transfer rate of (500×n) kbit/s; and
   transferring data at a transfer rate of (500×n) kbit/s through a universal serial bus interface.

15. A method of operating a floppy disc drive apparatus according to claim 14, wherein the spindle motor is rotated at a rotational speed of 600 rpm or more, data is transferred between the floppy disc controller and the mechanism control at a transfer rate of 1 Mbit/s or greater, and data is transferred through the universal serial bus interface at a data transfer rate of 1 Mbit/s or greater.

16. A method of operating a floppy disc drive apparatus according to claim 14, further comprising the step of operationally connecting the mechanism controller and the floppy disc controller by a signal cable.

17. A method of operating a floppy disc drive apparatus according to claim 14, further comprising the step of mounting the floppy disc controller, the drive mechanism and the mechanism controller on a common base member.

18. A method of operating a floppy disc drive apparatus according to claim 14, further comprising the step of forming the spindle motor with a cylindrical drive magnet and stator cores in a manner that an internal peripheral surface of the drive magnet is disposed opposite in a radial direction to an external peripheral surface of the stator cores.

* * * * *